US008643779B2

(12) United States Patent
Suess et al.

(10) Patent No.: US 8,643,779 B2
(45) Date of Patent: Feb. 4, 2014

(54) LIVE AUDIO TRACK ADDITIONS TO DIGITAL STREAMS

(75) Inventors: Jason Suess, Seattle, WA (US); Aleksandar Zambelli, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 25 days.

(21) Appl. No.: 13/290,137

(22) Filed: Nov. 7, 2011

(65) Prior Publication Data

US 2013/0057759 A1 Mar. 7, 2013

Related U.S. Application Data

(60) Provisional application No. 61/531,787, filed on Sep. 7, 2011.

(51) Int. Cl.
*H04N 7/08* (2006.01)

(52) U.S. Cl.
USPC .......................................................... 348/462

(58) Field of Classification Search
USPC .............. 348/462, 460, 461, 738, 14.08, 515, 348/512–514, 516, 510, 500; 386/95, 96
See application file for complete search history.

(56) References Cited

U.S. PATENT DOCUMENTS

| | | | |
|---|---|---|---|
| 5,900,908 A * | 5/1999 | Kirkland | 348/62 |
| 7,735,111 B2 | 6/2010 | Michener et al. | |
| 8,255,552 B2 * | 8/2012 | Witt et al. | 709/231 |
| 2001/0021307 A1 * | 9/2001 | Wang et al. | 386/96 |
| 2009/0006643 A1 | 1/2009 | Lee | |
| 2009/0323802 A1 * | 12/2009 | Walters et al. | 375/240.01 |
| 2011/0010624 A1 * | 1/2011 | Vanslette et al. | 715/704 |
| 2011/0202967 A1 | 8/2011 | Hecht et al. | |
| 2011/0285863 A1 * | 11/2011 | Burke et al. | 348/207.1 |
| 2012/0069137 A1 * | 3/2012 | Thapa | 348/14.08 |
| 2012/0221148 A1 * | 8/2012 | Menard et al. | 700/275 |
| 2012/0240061 A1 * | 9/2012 | Hillenius et al. | 715/753 |

OTHER PUBLICATIONS

Bocharov, et al., "Portable encoding of audio-video objects: The Protected Interoperable File Format (PIFF)", Retrieved at << http://go.microsoft.com/?linkid=9682897>>,Mar. 9, 2010, pp. 32.

"HTTP Dynamic Streaming—Part 2: Late-Binding Audio Using OSMF", Retrieved at <<http://www.realeyes.com/ blog/2011/07/28/http-dynamic-streaming-part-2-late-binding-audio-using-osmf/>>, Jul. 28, 2011, pp. 10.

(Continued)

*Primary Examiner* — Paulos M Natnael
(74) *Attorney, Agent, or Firm* — Kevin Sullivan; Kate Drakos; Micky Minhas

(57) ABSTRACT

Audio tracks may be added to a live video stream using one or more mixers that may decode the audio from a video stream, mix an additional audio stream, and encode the mixed audio stream. The system may make the new audio stream available for live download by consumers. The mixers may include a video playback mechanism to view the live video stream, as well as an audio capture and mixing system that may create a new audio track that may be synchronized with the video stream using timestamps. A consumer device may download and consume the video with the new audio track on a slight delay from the live video stream.

19 Claims, 2 Drawing Sheets

(56) References Cited

OTHER PUBLICATIONS

Guerrasio, Giuseppe, "Multi-language audio with IIS Smooth Streaming: An example from Radiovaticana Live Streaming", Retrieved at << http://blogs.msdn.com/b/giuseppeguerrasio/archive/2011/01/08/multi-language-audio-with-iis-smooth-streaming-an-example-from-radiovaticana-live-streaming.aspx >>, Jan. 8, 2011, pp. 6.

"About timecode", Retrieved at << http://help.adobe.com/en_US/FlashMediaLiveEncoder/3.0/Using/WS5b3ccc516d4fbf351e63e3d11c104ba9cd-8000.>>, Retrieved Date: Nov. 3, 2011, pp. 2.

* cited by examiner

LIVE AUDIO TRACK ADDITIONS TO DIGITAL STREAMS

BACKGROUND

Many video programs may have multiple audio tracks. In a typical use, a video signal may have an audio track in English and another audio track in Spanish. A consumer may select the video program and then select an accompanying audio track.

SUMMARY

Audio tracks may be added to a live video stream using one or more mixers that may decode the audio from a video stream, mix an additional audio stream, and encode the mixed audio stream. The system may make the new audio stream available for live download by consumers. The mixers may include a video playback mechanism to view the live video stream, as well as an audio capture and mixing system that may create a new audio track that may be synchronized with the video stream using timestamps. A consumer device may download and consume the video with the new audio track on a slight delay from the live video stream.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
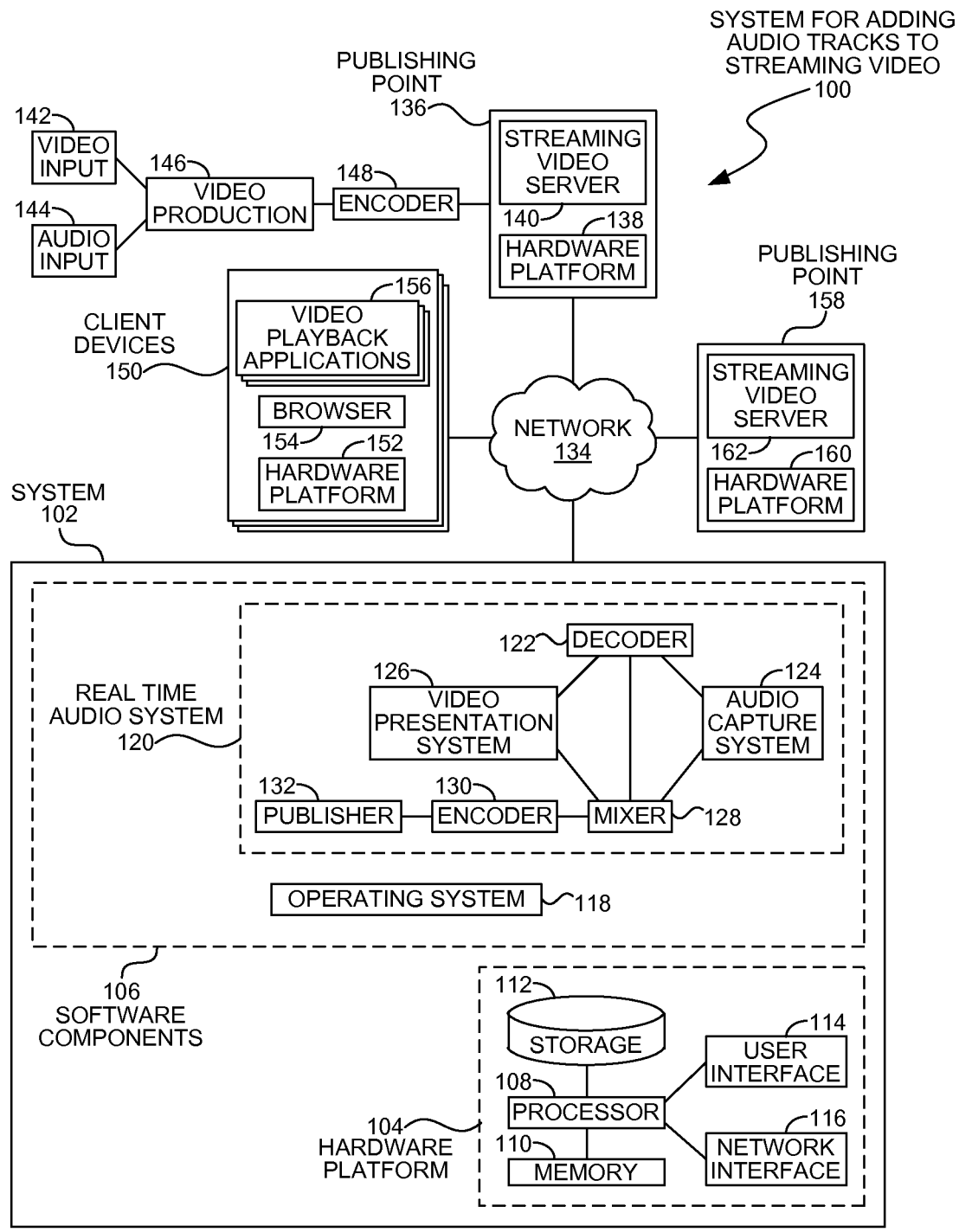
FIG. 1 is a diagram of an embodiment showing a network environment with a system for adding real time audio to a live video stream.

Audio tracks may be added to published live video by receiving the live video, adding a new audio track, encoding and publishing the new audio track. A system for performing these operations may be located downstream from the video production system that produced, encoded, and transmitted the video, yet may only add a slight delay to the availability of the new audio track. Consumers may download and consume the new audio track along with the video on a slightly delayed basis from the live video.

In one use scenario, a sporting event may be broadcast to multiple countries in multiple languages. The original video feed may be created and produced at the sporting event location, then encoded and transmitted to a publishing point as a live video stream with an ambient audio soundtrack. The ambient audio soundtrack may merely be audience sounds and other sounds of the event, but without commentary.

In the use scenario, commentators and other on-air talent may use the real time audio system to add commentary to the live video stream, and consumers may download and view the video with only a slight delay. Because the sporting event may be broadcast to multiple countries, each country or region may have their own commentators in their own language. Further, because the real time audio systems may be located anywhere, each commentator may be physically located in their home countries without incurring the costs of travel and production at the site of the sporting event.

The real time audio system may retrieve the published video stream and present the video on a display, while capturing a new audio track. In the use scenario above, the local talent may watch the video and provide commentary which is captured by a microphone.

The system may create a new audio stream by mixing the new audio stream with the ambient audio provided with the live video, then encode the new audio stream and publish the new audio stream.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100, showing a network environment in which a real time audio system may operate. Embodiment 100 may be a simplified example of a live video production and delivery system that uses a post-encoding real time audio system to publish additional audio tracks.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is a simplified example of a video production and consumption system. Video may be produced in one location, additional audio tracks may be added in a second location, and the video may be consumed in many other locations. The additional audio tracks may be added in real time by a system 102, which may create a new audio track, encode the audio track, and publish the new audio track in real time.

In many cases, un-encoded video may use too much bandwidth to transport over long distances. Un-encoded video may be used between cameras and a production studio on location, then encoded for transport across long distances. The encoding may be a multimedia container format that may compress the video and audio signals.

Examples of a multimedia container formats include MPEG2, MPEG), MPEG4, 3GP, ASF, WMA, WMV, AVI, RIFF, DVR-MS, Flash Video (FIN, F4V), IFF, Matroska (MKV), MJ2, JPEG 2000, QuickTime, Ogg, RM, NUT, MXF, GXF, radDVD, SVI, VOB, DivX, or other formats.

Each multimedia container format may have different characteristics. In some cases, a container format may be designed for streaming over the Internet and have lower resolution with a highly tolerant synchronization mechanism. Other container formats may be better suited for streaming within closed networks where higher resolution images and audio may be transmitted.

A multimedia container format may contain audio, video, and various metadata. Some container formats may interleave different data types, and some may, support multiple types of audio or video streams. Many container formats may include metadata, which may include captioning, titles, or other metadata. In many cases, the container formats may include timestamps for synchronizing and ordering packets of data transmitted in the format.

In some embodiments, a container format may be configured so that a client device may download the audio and video components separately. Other embodiments may only permit downloading the audio and video components together.

Many container formats may have different names for various parts of the container. For example, RIFF and PNG may contain "chunks", QuickTime and MP4 may contain "atoms", MPEG-TS may contain "packets", and JPEG may contain "segments". In each case, the chunk, atom, packet, or segment may contain data or a payload. The payloads may have headers or other metadata that may include synchronization information that allow a recipient system to place the payloads in order for presentation.

A live video and audio stream may be published at a publishing point. A publishing point may be a streaming video server that may serve video to consumers. In many embodiments, the publishing point may distribute the video and audio in the same format as the video was encoded after production.

A real time audio system may download the live video from a publishing point in order to add another audio track. The system may display the video and simultaneously capture new audio. The new audio track may be synchronized with the video, encoded, and published for consumption.

In many embodiments the real time audio system may decode an existing audio track from the live video and mix the new audio track with the existing audio track. In many cases, the original live video may be produced with only an ambient audio track that may be customized using the real time audio system.

The decoding of the audio track may not reproduce the precision of the original audio track. Many encoding and decoding systems may be lossy, in that some of the data are distorted or lost during the encoding and decoding process. In some applications, such a lossy system may still yield acceptable results. Other applications may use encoding and decoding systems that are not lossy.

The decoded audio track may be mixed with the new audio track by the real time audio system. The mixing system may adjust the volume of each audio track to create a mixed audio track. Some mixers may allow various audio effects to be added to the audio to enhance or manipulate the sound produced by the track.

The new audio track may contain any type of audio signal. In the example of a sporting event, additional audio tracks may include announcers or commentators that speak various languages to localize the sporting event for people of different languages or nationalities. Other examples may include adding music, voice, sound effects, or other audio signal.

Many embodiments may show the video stream while capturing a new audio stream. In the case of the sporting event example, the local talent may view the video while speaking into a microphone. In the case of additional music or sound effects, the performer or editor may view the video while creating or synchronizing the additional audio track.

Some embodiments may use the real time audio system to create localized or customized advertisements as part of a video stream. The advertisements may be customized for a particular location, such as a country, state, or city. In some embodiments, the advertisements may be customized for the particular user or consumer. In such embodiments, a separate real time audio system may be used for each consumer of the video stream.

The device 102 may have a set of hardware components 104 and software components 106. The client device 102 may represent any type of device that may, communicate with a live system 126.

The hardware components 104 may represent a typical architecture of a computing device, such as a desktop or server computer. In some embodiments, the client device 102 may be a personal computer, game console, network appliance, interactive kiosk, or other device. The client device 102 may also be a portable device, such as a laptop computer, netbook computer, personal digital assistant, mobile telephone, or other mobile device.

The hardware components 104 may include a processor 108, random access memory 110, and nonvolatile storage 112. The processor 108 may be a single microprocessor, multi-core processor, or a group of processors. The random access memory 110 may store executable code as well as data that may be immediately accessible to the processor 108, while the nonvolatile storage 112 may store executable code and data in a persistent state.

The hardware components 104 may also include one or more user interface devices 114 and network interfaces 116. The user interface devices 114 may include monitors, displays, keyboards, pointing devices, and any other type of user interface device. The network interfaces 116 may include hardwired and wireless interfaces through which the device 102 may communicate with other devices.

The software components 106 may include an operating system 118 on which various applications may execute.

A real time audio system 120 may receive a live streaming video stream and create a new audio track for the video stream, then publish the new audio track. The real time audio system 120 may create the new audio in real time or near real time so that consumers may receive the new audio track in a streaming fashion with a minimum of delay. In a typical embodiment, the delay may be as little as or even less than five seconds.

The real time audio system 120 may include a decoder 122 that may decode an incoming multimedia stream. The multimedia stream may include encoded video and encoded audio streams. The decoder 122 may decode the video stream so that a video presentation system 126 may play back the video. The decoder 122 may also decode the audio stream so that a mixer 128 may mix the existing audio stream with a new audio stream captured by an audio capture system 124.

The audio capture system 124 may be any mechanism by which a new audio stream may be created or captured. In a simple embodiment, the audio capture system 124 may be a microphone, although other embodiments may have any type of audio generation or playback equipment, such as sound effects generators, prerecorded audio playback equipment, or other equipment.

The mixer 128 may prepare the new audio track. In many embodiments, the mixer 128 may mix an existing audio track decoded from the live video stream with a new audio track.

After mixing, the new multimedia stream may be encoded using the encoder 130 and published by the publisher 132 to make the new live stream available for consumers.

The system 102 may be connected to a network 134, which may be the Internet, a wide area network, a local area network, or other network. In some cases, the network 134 may be a wired network, wireless network, or combination of wired and wireless networks. In many cases, the network 134 may be a packetized network.

The system 102 may receive the live video stream from a publishing point 136, which may have a hardware platform 138 on which a streaming video server 140 may operate. The hardware platform 138 may be similar to the hardware platform 104.

The streaming video server 140 may receive video that has been produced upstream and encoded for distribution.

A video input 142 and audio input 144 may feed a video production system 146. The video input 142 may be one or more cameras, and the audio input 144 may be one or more microphones or other audio capture or production devices.

The video production system 146 may mix various audio and video feeds into a single multimedia stream. In the case of a sporting event, the video production system 146 may include many cameras and audio input devices. Some sporting events may have many dozens of cameras, for example, that may be mixed into a single video feed.

The video production system 146 may pass the finished video through an encoder 148, which may then forward the multimedia to the publishing point 136. In many cases, the raw video may consume a very large bandwidth and the encoder 148 may be an efficient way to compress a video stream for transmission over the Internet or other long distance network.

In some embodiments, the video stream transmitted to the publishing point 136 and consumed by the real time audio system 120 may contain audio tracks or metadata that do not get published to consumers. For example, the video stream consumed by the real time audio system 120 may include an audio track that includes director or producer comments about the video that may guide a remote director or producer who manages a local audio generation. In the example, the video stream may include an audio track that tells what camera angles are coming up, when a commercial break is about to occur, or other content. In some cases, such information may be included in metadata that may accompany the live video stream.

In such embodiments, the metadata or supplemental audio tracks may be intended only for the users of the real time audio system 120 and not for the general consumers who may view the finished video product.

Various client devices 150 may consume the finished multimedia content. The client devices 150 may have a hardware platform 152 on which various browsers 154 or other applications 156 may download and display the live video streams.

In many embodiments, the client devices 150 may download a video stream at a slight delay from the live video stream consumed by the system 102. The delay may allow the system 102 to add a new audio track to the video for the client devices 150. In many embodiments, the delay may be five seconds, although other embodiments may have seven, ten, fifteen, or twenty second delays.

The delays may be imposed in several different manners. In one manner, the client devices 150 may have a buffer or delay that causes the client devices 150 to request the live video stream with the delay. In another manner, the publishing point 136 may have two classes or types of recipients or subscribers. The first type of subscriber may be the system 102 where the live video content may be retrieved and modified. The second type of subscriber may be the client devices 150. Some such embodiments may have two channels for the different types of subscribers.

A third manner for imposing a subscription delay may be for the real time audio system 120 to publish the modified video stream to a second publishing point 158. The second publishing point 158 may stream the updated video stream to the client devices 150. The video stream provided on the second publishing point 158 may be the slightly delayed video stream that incorporates the new audio track.

The second publishing point 158 may be similar to the publishing point 136, in that the publishing point 158 may include a hardware platform 160 on which a streaming video server 162 may operate.

The video stream produced by the publisher 132 of the real time audio system 120 may be a single video stream with multiple audio tracks. In one such embodiment, several real time audio systems 120 may each create additional audio tracks and a consumer may be able to select between different audio tracks when watching a video stream.

Some embodiments may create a new stream that contains the original video plus the new audio track. In such embodiments, a subscriber may be able to choose between multiple video streams, each having a different audio track accompanying the same video images.

Figure 2:
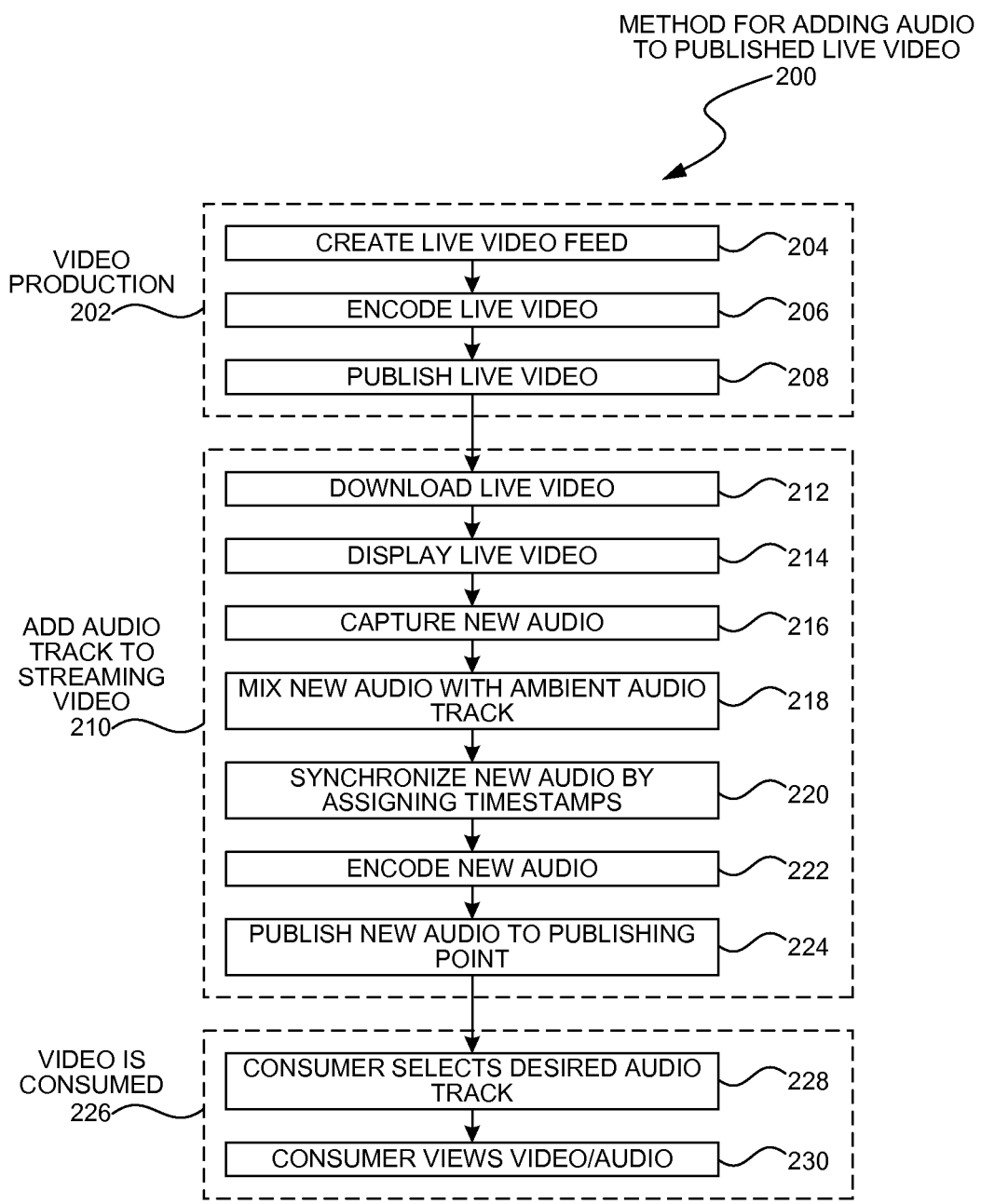
FIG. 2 is a flowchart of an embodiment showing a method for adding audio to a published video stream.

FIG. 2 is a flowchart illustration of an embodiment 200 showing method for adding audio to a published live video stream.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 illustrates one method by which video may be produced at one location, an audio track may be added to the video at another location, and the video may be consumed at a third location. The originally produced video may be encoded and published at a publishing point. An audio track may be added to the streaming video and republished, to be consumed by a consumer.

In block 202, the original video production may occur. A live video feed in block 204 may be encoded in block 206 and published in block 208. The live video feed may include an ambient audio track in some embodiments. Some embodiments may also include a director's soundtrack with instructions or descriptions of the scenes to come, commercial breaks, or other production information.

When the video feed is published in block 208, the encoded video may have an audio track added to the streaming video stream in block 210.

The live stream may be downloaded in block 212 and displayed in block 214. While the video is being displayed in block 214, new audio may be captured in block 216.

The new audio track may be mixed in block 218. In many cases, the new audio track may be mixed with an ambient audio track.

The new audio track may be synchronized in block 220 by assigning timestamps to the new audio track. The timestamps may correlate with the timestamps of the live video displayed in block 214. The timestamps may allow a client device to synchronize the audio and video streams during display.

The new audio may be encoded in block 222. In some embodiments, the new audio may be encoded with the video to create a new multimedia stream. In other embodiments, the new audio may be separately encoded and added to the existing video stream as an optional audio channel.

The new audio may be published to a publishing point in block 224. In some embodiments, the new audio may be published back to the same publishing point from where the video was retrieved in block 212. In other embodiments, a second publishing point may be used.

After publication with the new audio track, the video may be consumed in block 226. A consumer may select a desired audio track or version of the video having a desired audio track in block 228. The video and audio may be downloaded and viewed in block 230.

The foregoing description of the subject matter has been presented for purposes of illustration and description. It is not intended to be exhaustive or to limit the subject matter to the precise form disclosed, and other modifications and variations may, be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
a connection to an encoded live video stream delivered on a first publishing point, said encoded live video stream having an audio stream encoded into said encoded live video stream;
at least one computer processor operating a mixing system comprising:
a video presentation system that presents said live video stream on a display;
an audio capture mechanism that receives a new audio stream;
a mixer that mixes said audio stream with said new audio stream;
an encoder that encodes said new audio stream into an encoded new audio stream; and
a publisher that publishes said encoded new audio stream on a second publishing point; and
wherein said audio capture mechanism determines timestamps as said encoded live video stream is displayed and applies said timestamps to said new audio stream as said new audio stream is received.

2. The system of claim 1, said first publishing point and said second publishing point being the same publishing point.

3. The system of claim 1, said first publishing point and said second publishing point being different publishing points.

4. The system of claim 1, said mixing system further comprising:
a playback system for said audio stream.

5. The system of claim 1, said encoded live video stream being encoded in a multimedia container format.

6. The system of claim 5, said multimedia container format comprising a video container and at least one audio container.

7. The system of claim 6, said mixing system that encodes said new audio stream into a new audio container in said multimedia container format.

8. The system of claim 1, said encoded live video stream being created at a first geographic location and said mixing system being located a second geographic location.

9. A method performed on at least one compute processor, said method comprising:
receiving a live video stream from a first publishing point;
displaying said live video stream on a video display;
accessing an audio track from said live video stream;
mixing said audio track with a captured audio track to create a new audio track;
synchronizing said new audio track with said live video stream;
creating an encoded new audio track from said new audio track; and
publishing said encoded new audio track with said live video stream as a modified live video stream.

10. The method of claim 9, said modified live video stream being published on said first publishing point.

11. The method of claim 9, said modified live video stream being published on a second publishing point.

12. The method of claim 9, said accessing an audio track from said live video stream comprising decoding said live video stream to create said audio track.

13. The method of claim 12 further comprising:
said encoded new audio track being an alternative audio track for said live video stream.

14. The method of claim 9, said first publishing point being a streaming video stream on a packetized network.

15. The method of claim 9, said synchronizing being performed by matching timestamps from said live video stream with timestamps in said new audio track.

16. The method of claim 9, said publishing comprising publishing said live video stream and said encoded new audio track as two separately downloadable components of said modified live video stream.

17. The method of claim 9, said publishing of said modified live video stream causing less than a five second delay relative to said live video stream.

18. A method comprising:
creating a live video stream at a first geographic location, said live video stream comprising an ambient audio track;
encoding said live video stream into a multimedia container format comprising a video stream container and an ambient audio track container;
publishing said live video stream on a first publishing point;
downloading said live video stream from said first publishing point;
displaying said live video stream on a display device;
receiving a supplemental audio track;
synchronizing said supplemental audio track to said live video stream by retrieving timestamps from said live video stream and placing said timestamps on said supplemental audio track;
decoding said ambient audio track and mixing said supplemental audio track with said ambient audio track to create a new audio track;
encoding said new audio track to create an encoded new audio track; and
publishing said new audio track on said first publishing point.

19. The method of claim 18 further comprising:
publishing said new audio track on said first publishing point such that a consumer device downloads and displays said new audio track with less than a five second delay from said live video stream.

\* \* \* \* \*